(12) United States Patent
Connor, Jr. et al.

(10) Patent No.: US 11,886,206 B2
(45) Date of Patent: Jan. 30, 2024

(54) PRESSURE REGULATOR FOR FLUID HAMMER REDUCTION

(71) Applicant: Hydril USA Distribution LLC, Houston, TX (US)

(72) Inventors: Michael James Connor, Jr., Houston, TX (US); Alexander McAuley, Houston, TX (US); David Kindt, Houston, TX (US); Zachary Stewart, Houston, TX (US)

(73) Assignee: Hydrill USA Distribution LLC, Houston, TX (US)

( * ) Notice: Subject to any disclaimer, the term of this patent is extended or adjusted under 35 U.S.C. 154(b) by 93 days.

(21) Appl. No.: 17/365,457

(22) Filed: Jul. 1, 2021

(65) Prior Publication Data
US 2021/0325915 A1    Oct. 21, 2021

Related U.S. Application Data

(62) Division of application No. 14/971,381, filed on Dec. 16, 2015, now abandoned.
(Continued)

(51) Int. Cl.
*E21B 33/064*    (2006.01)
*G05D 16/02*    (2006.01)
(Continued)

(52) U.S. Cl.
CPC .......... *G05D 16/02* (2013.01); *E21B 33/061* (2013.01); *E21B 33/064* (2013.01); *E21B 34/16* (2013.01);
(Continued)

(58) Field of Classification Search
CPC .... F16K 11/044; F16K 11/00; F16K 11/0716; F16K 31/1221; F16K 31/1635;
(Continued)

(56) References Cited

U.S. PATENT DOCUMENTS

4,011,892 A * 3/1977 Kowalski ................ F16K 11/02
                                                               251/63.5
4,098,341 A * 7/1978 Lewis ....................... E21B 33/06
                                                               251/1.2
(Continued)

*Primary Examiner* — Craig J Price
*Assistant Examiner* — Andrew J Rost
(74) *Attorney, Agent, or Firm* — Osha Bergman Watanabe & Burton LLP (57) ABSTRACT

A pressure regulator for a BOP stack includes a housing having an input port, an output port, and a pilot port and a regulator piston axially movable through the housing between an open position and a closed position. The regulator piston has an internal passage formed through its first axial end. When the regulator piston is in the open position, the internal passage is in fluid communication with the input and output ports. When the regulator piston is in the closed position, the internal passage is in fluid communication with the output port and fluidly isolated from the input port. A space with regulator fluid is also provided within the housing adjacent a second axial end of the regulator piston, opposite the first axial end, wherein the space is fluidly isolated from the input port and the output port in both the open position and the closed position.

7 Claims, 10 Drawing Sheets

Related U.S. Application Data (60) Provisional application No. 62/093,051, filed on Dec. 17, 2014.

(51) Int. Cl.
*E21B 34/16* (2006.01)
*F16K 11/07* (2006.01)
*F16K 31/122* (2006.01)
*E21B 33/06* (2006.01)
*F16K 31/124* (2006.01)

(52) U.S. Cl.
CPC ...... *F16K 11/0716* (2013.01); *F16K 31/1226* (2013.01); *F16K 31/1245* (2013.01); *E21B 2200/06* (2020.05)

(58) Field of Classification Search
CPC ............. F16K 31/1245; F16K 31/1226; E21B 33/035; E21B 33/038; E21B 33/064; E21B 33/061; E21B 34/16; E21B 2034/007; E21B 2200/06; G05D 16/02; G05D 16/2013
See application file for complete search history.

(56) References Cited

U.S. PATENT DOCUMENTS

| 4,614,148 | A | * | 9/1986 | Bates | E21B 33/06 251/1.2 |
| 4,887,643 | A | * | 12/1989 | Tomlin | F16K 11/0716 137/625.68 |
| 8,113,184 | B2 | * | 2/2012 | Seiyama | F02M 26/70 123/568.26 |
| 8,905,141 | B2 | * | 12/2014 | Gustafson | E21B 34/04 166/85.4 |
| 9,010,376 | B2 | * | 4/2015 | Watts | G05D 16/101 137/625.2 |
| 9,453,518 | B2 | * | 9/2016 | Schulz | F15B 13/043 |
| 2012/0145252 | A1 | * | 6/2012 | Hunnicutt | F16K 31/426 137/625.69 |
| 2013/0054034 | A1 | * | 2/2013 | Ebenezer | E21B 33/06 700/282 |
| 2016/0222746 | A1 | * | 8/2016 | Gustafson | E21B 34/16 |

* cited by examiner

PRESSURE REGULATOR FOR FLUID HAMMER REDUCTION

CROSS REFERENCE TO RELATED APPLICATIONS

This is a divisional of U.S. patent application Ser. No. 14/971,381, titled "PRESSURE REGULATOR FOR FLUID HAMMER REDUCTION," filed Dec. 16, 2015, which claims priority to and the benefit of U.S. Provisional Patent Application No. 62/093,051, titled "PRESSURE REGULATOR FOR FLUID HAMMER REDUCTION," filed Dec. 17, 2014, the entire content of which is incorporated herein by reference.

BACKGROUND OF THE INVENTION

1. Field of the Invention

Embodiments disclosed herein relate generally to pressure regulators. In particular, embodiments disclosed herein relate to pressure regulators wherein flow is controlled by pilot pressure.

2. Brief Description of Related Art

Drilling systems are often employed to access and extract oil, natural gas, and other subterranean resources from the earth. These drilling systems may be located onshore or offshore depending on the location of a desired resource. Further, such systems include a wide array of components, such as valves, that control drilling or extraction operations. Often, some of these components are controlled through pressure variation, such as that provided by a hydraulic control system.

In some such systems, a hydraulic pressure regulator may be used to provide a fluid at a regulated working fluid pressure to downstream components, such as, for example, solenoid valves or BOP rams. One common type of hydraulic pressure regulator has a control piston that moves back and forth to open and close both supply ports and vent ports of the regulator in response to the magnitude of pressure within the regulator. As the control piston in the regulator moves toward a closed position, the operator piston in the associated function correspondingly moves toward a closed position, and the sudden reduction in flow can lead to vibrations in the downstream components. Such vibrations are known as fluid hammer, or water hammer. Such vibrations can degrade equipment and, over time, can lead to equipment failures and other problems.

SUMMARY OF THE INVENTION

One embodiment of the present technology provides a method of reducing hydraulic shock in a BOP system, the BOP system including a pressure regulator having an input port and an output port, and a regulator piston that moves between an open and a closed position based on a change in hydraulic pressure applied to the regulator piston via a pilot port, the open position creating a fluid path between the input port and the output port so that fluid can flow therebetween, and the closed position severing the fluid path. The method includes the steps of initiating a function, and monitoring the state of the function as it is carried out to predict when the function nears the end of its cycle. The method further includes transmitting information about the state of the function to a controller that controls the amount of hydraulic pressure applied to the regulator piston via the pilot port, and determining when the function reaches a predetermined state prior to the end of its cycle. In addition, the method includes when the function reaches the predetermined state, and adjusting the hydraulic pressure on the regulator piston via the pilot port to begin moving the regulator piston toward the closed position.

An alternate embodiment of the present technology provides a method of opening and closing a fluid flow path through a pressure regulator. The method includes the steps of providing an input port, and output port, and a pilot port at discrete locations on a housing of the pressure regulator, and providing a regulator piston within the housing. The regulator piston is movable within the housing along a longitudinal axis of the regulator piston, and has a hollow portion that allows fluid flow through the regulator piston. The regulator piston is in an open position when the hollow portion at least partially aligns with the input and output ports so that fluid flows between the input and output ports, and in a closed position when the hollow portion is not aligned with the input and output ports. The method further includes the step of controlling movement of the regulator piston between open and closed positions by adjustment of hydraulic pressure on the regulator piston, such hydraulic pressure provided via the pilot port.

Yet another embodiment of the present technology provides a hydraulic shock reducing pressure regulator for controlling a function on a BOP stack, including a housing having an input port, an output port, and a pilot port, and a regulator piston having a hollow portion and surrounded by the housing. The regulator piston is movable within the housing between an open position and a closed position, the regulator piston in the open position when the hollow portion connects the input port with the output port to allow pressure communication between the input port and the output port, and in the closed position when the hollow portion is misaligned from either the input port or the output port or both so that there is no pressure communication between the input port and the output port. In addition, a portion of the regulator piston is in pressure communication with the pilot port so that controlled changes in pressure in the pilot port move the regulator piston between the open position and the closed position and vice versa.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE PREFERRED EMBODIMENT

The foregoing aspects, features, and advantages of the present technology will be further appreciated when considered with reference to the following description of preferred embodiments and accompanying drawings, wherein like reference numerals represent like elements. The following is directed to various exemplary embodiments of the disclosure. The embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

Figure 1:
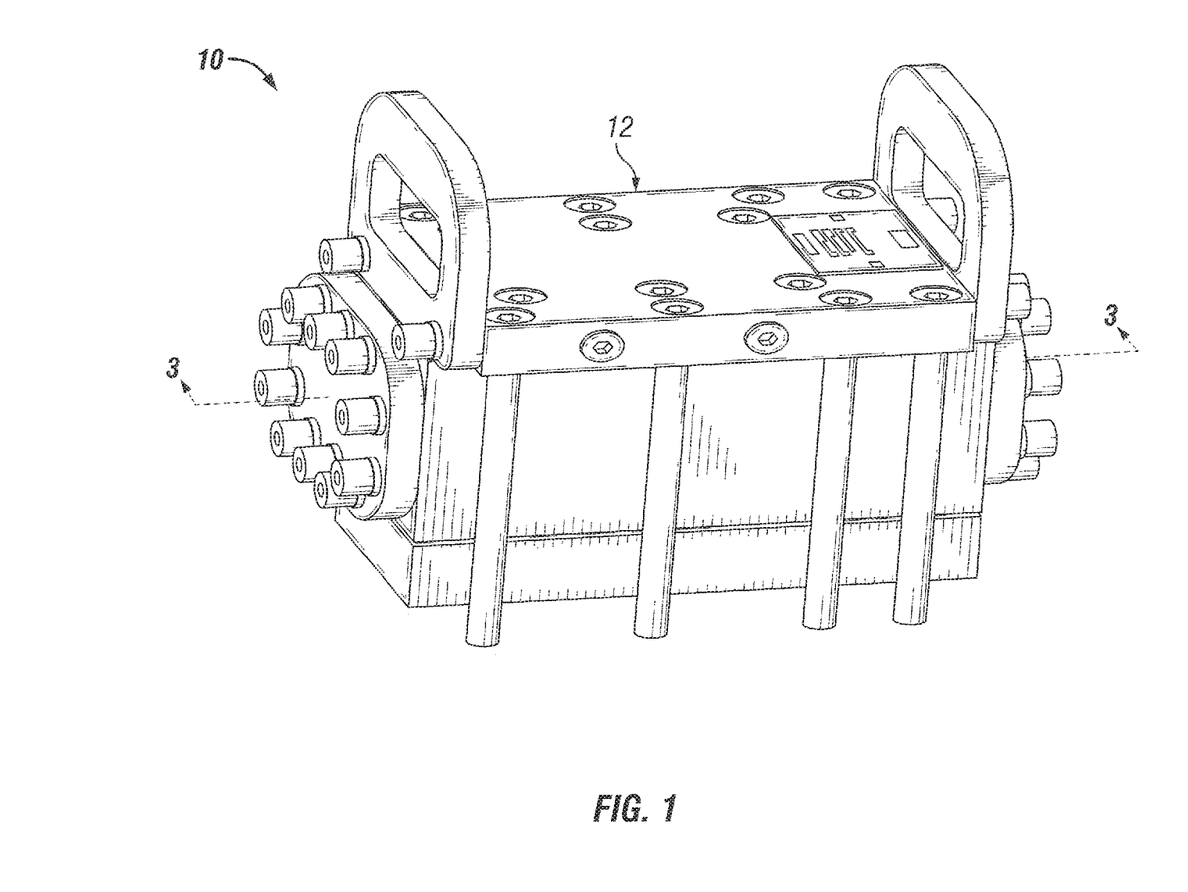
FIG. 1 shows an isometric view of a pressure regulator according to an embodiment of the present technology.

Referring now to the drawings, FIG. 1 depicts a pressure regulator 10 according to one example embodiment of the present technology. The pressure regulator 10 includes a regulator body 12 and a series of ports, described in greater detail below.

Figure 2:
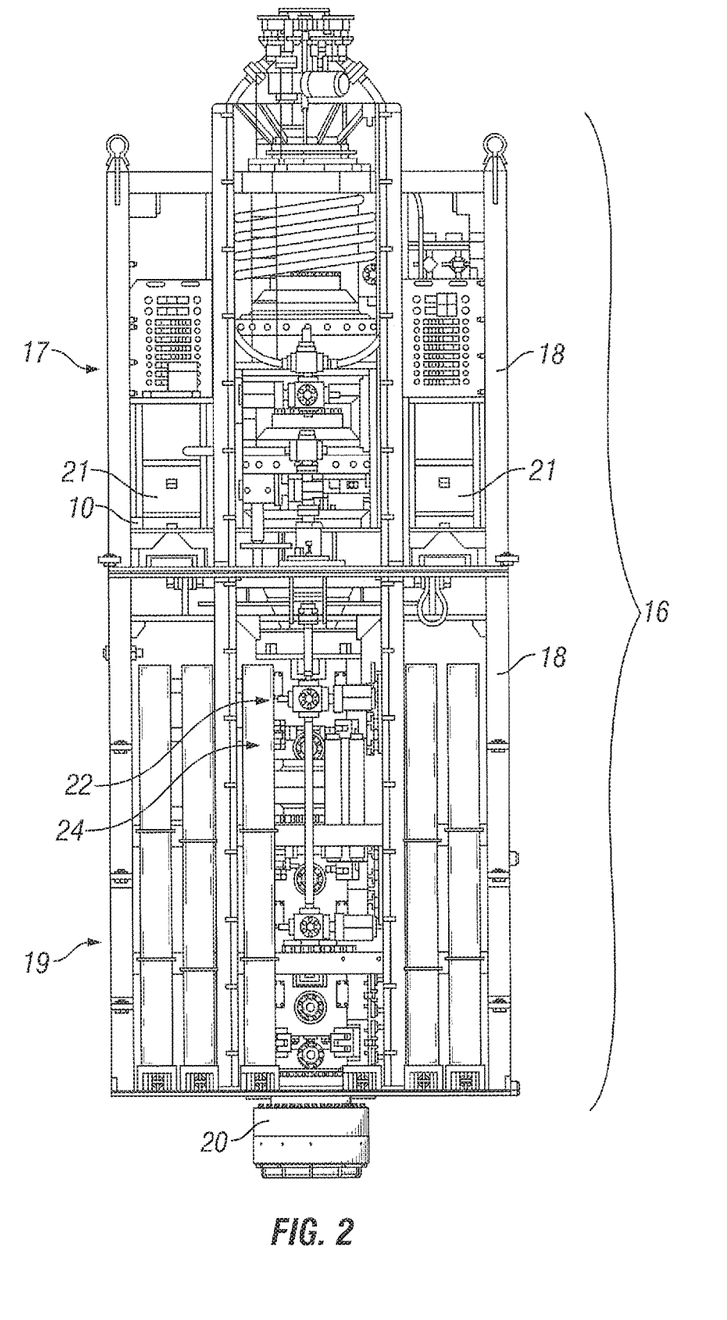
FIG. 2 shows a side view of a BOP stack according to an embodiment of the present technology, including the pressure regulator of FIG. 1.

FIG. 2 in turn depicts a BOP stack assembly 16, including a lower marine riser package (LMRP) 17, with the pressure regulator 10 attached thereto, and a lower stack 19. The LMRP 17 includes, among other components, control pods 21 for controlling components of the BOP stack 16 assembly. The LMRP conducts fluid from a riser (not shown) through the control pods 21 to the lower stack 19.

The lower stack 19 includes typical BOP features, such as, for example, a frame 18 with a wellhead connector 20 at the lower end for connecting to a subsea wellhead assembly (not shown). Typically, a bore runs through the BOP stack assembly 16, including the lower stack 19, which bore may contain a pipe. A shear ram housing 22 is typically located above a pipe ram housing 24. The shear ram housing 22 contains shear ram blocks (not shown) positioned to close across the bore and shear the pipe in an emergency, to seal off the well. The pipe ram housing 24 contains pipe ram blocks (not shown) positioned to close across the bore and seal around the pipe, thereby sealing the annulus around the pipe. In the embodiment shown in FIG. 2, there are multiple sets of ram housings.

In some embodiments, the pressure regulator 10 of the present technology can be hydraulically coupled to the shear and/or pipe ram housings to provide hydraulic pressure to close the shear and/or pipe ram blocks, as explained in greater detail below. The pressure regulator 10 can also be used to hydraulically control other components of the BOP stack, such as, for example, choke and kill valves.

Figure 3:
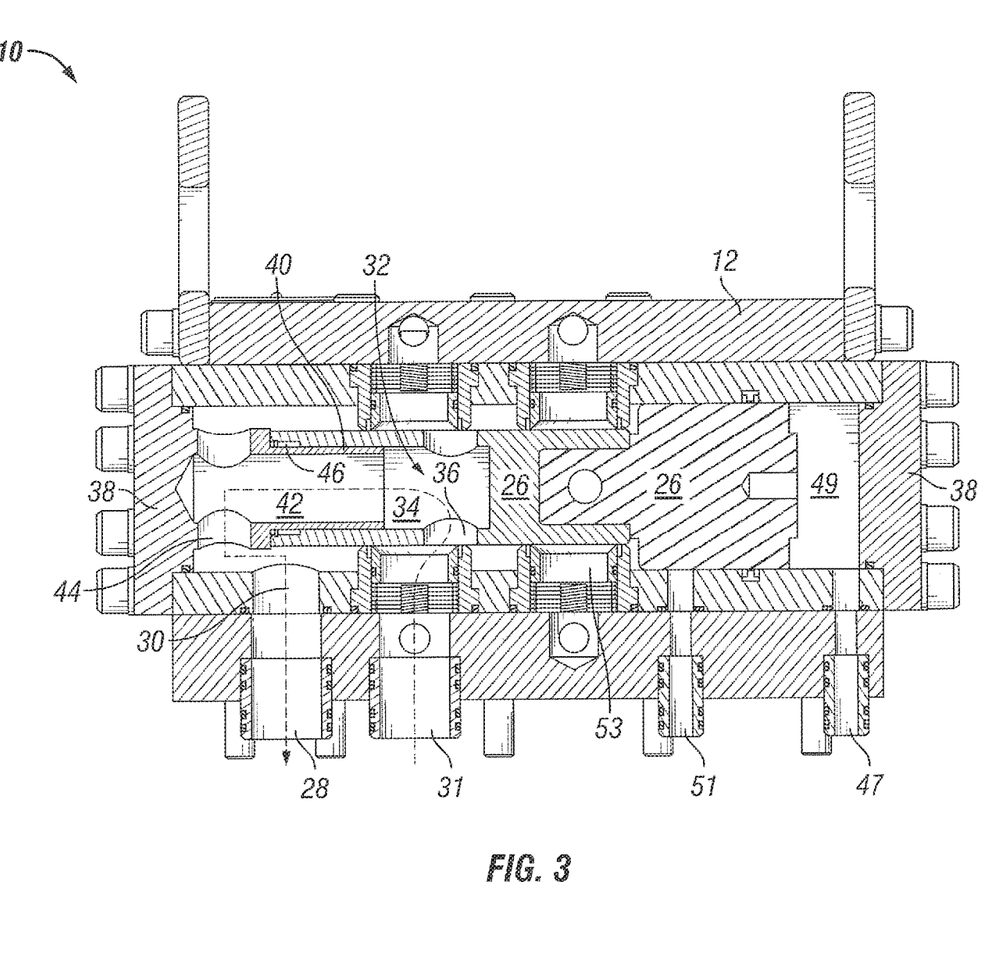
FIG. 3 shows a cross-sectional view of the pressure regulator of FIG. 1 taken along line 3-3 of FIG. 1, with the regulator piston in the open position.

Referring now to FIG. 3, a cross-sectional view of a pressure regulator 10 in accordance with one or more embodiments of the present technology is shown. The pressure regulator 10 includes a regulator body 12. A regulator piston 26 is slidably disposed within the regulator body 12. In FIG. 3, the regulator piston 26 is shown to consist of two separate parts. This design allows for ease of assembly during the manufacturing process. In other embodiments, the regulator piston can consist of a single part, or more than two parts. The regulator piston 26 is in fluid communication with an outlet 28 of the regulator body 12 via path 30, as well as an inlet 31. The outlet 28 in turn is in communication with a function, such as, for example, a pair of BOP rams or a valve. One purpose of the pressure regulator 10 is to help maintain a constant pressure at the outlet 28. The inlet 31 is in communication with a supply of fluid, such as a hydraulic system or an accumulator.

The regulator piston 26 includes an internal passage 32, which in turn includes a longitudinal piston bore passage 34 and a transverse piston bore passage 36 that intersects the longitudinal piston bore passage 34. The regulator body 12 can also include regulator caps 38 that attach to and seal ends of the regulator body 12. One of the regulator caps 38 has a protrusion 40 that extends into the regulator body 12. The protrusion is hollow and encloses a longitudinal cap bore passage 42 and a transverse cap bore passage 44 that intersects the longitudinal cap bore passage 42. The longitudinal cap bore passage 42 can be coaxial with the longitudinal piston bore passage 34. As shown, the longitudinal piston bore passage 34 is of sufficient diameter to accept insertion of at least a portion of the protrusion 40 so that when the regulator body 12 is fully assembled, the regulator piston 26 surrounds a portion of the protrusion 40. The regulator piston 26 is axially moveable relative to the protrusion 40, and the interface between the regulator piston 26 and the protrusion 40 is guided with a regulator piston bearing 46. The end of the protrusion 40 is open so that fluid is free to flow between the longitudinal piston bore passage 34 and the longitudinal cap bore passage 42.

In addition to the above, the regulator 10 also includes a pilot port 47 that controls hydraulic pressure to an end of the regulator piston 26 opposite the internal passage 32 of the regulator piston 26. Such hydraulic pressure can be increased by introducing fluid through the pilot port 47 into the space 49 adjacent the end of the regulator piston 26, and decreased by removing fluid from the space 49. One purpose of the pilot port 47 is to help move the regulator piston 26 between open and closed positions by increasing and decreasing the hydraulic pressure on the regulator piston 26.

Also as shown in FIG. 3, the regulator 10 can optionally include a pressure read back port 51, the purpose of which is to provide access to the inside of the housing 12 for taking a pressure reading inside the housing 12, which pressure reading may be used to help determine the appropriate pressure to provide in space 49 via the pilot port 47. The pressure regulator 10 also includes a vent port 53. At times the pressure in the outlet 28 can exceed the pilot pressure in space 49. When this occurs, such high pressure in the outlet 28 can move the regulator piston 26 further toward the closed position, until the transverse piston bore passage 36 partially aligns with the vent port 53. Such alignment allows venting of fluid from the regulator via the vent port 53 until the pressure in the outlet 28 returns to the pilot pressure in space 49, and the regulator piston 26 returns to the closed position shown in FIG. 4.

The functionality of the regulator 10 will now be described in reference to FIGS. 3 and 4. In the drawings, FIG. 3 shows the regulator 10, with the piston in an open position (with a flow path open between the inlet 31 and the outlet 28 along path 30). As discussed above, the regulator piston 26 is in constant fluid communication with an outlet 28 of the regulator body 12 regardless of its position within the regulator housing 12. In the open position of FIG. 3, the transverse piston bore passage 36 is in fluid communication with the inlet 31 via path 30 as well. Typically, the regulator piston 26 is in the open position because the pressure at the outlet 28 is lower than desired. To remedy this deficiency in pressure, a fluid at the inlet 31 can be provided that is at a higher pressure than the desired pressure at the outlet 28.

For example, in the example embodiment of FIG. 3, if the pressure at the outlet 28 is less than 3,000 psi, and an operator desires to raise the pressure at the outlet 28 to 3,000 psi, then a fluid can be provided at the inlet 31 that is higher than 3,000 psi. The higher pressure at the inlet 31 in this embodiment raises the pressure at the outlet 28.

Figure 4:
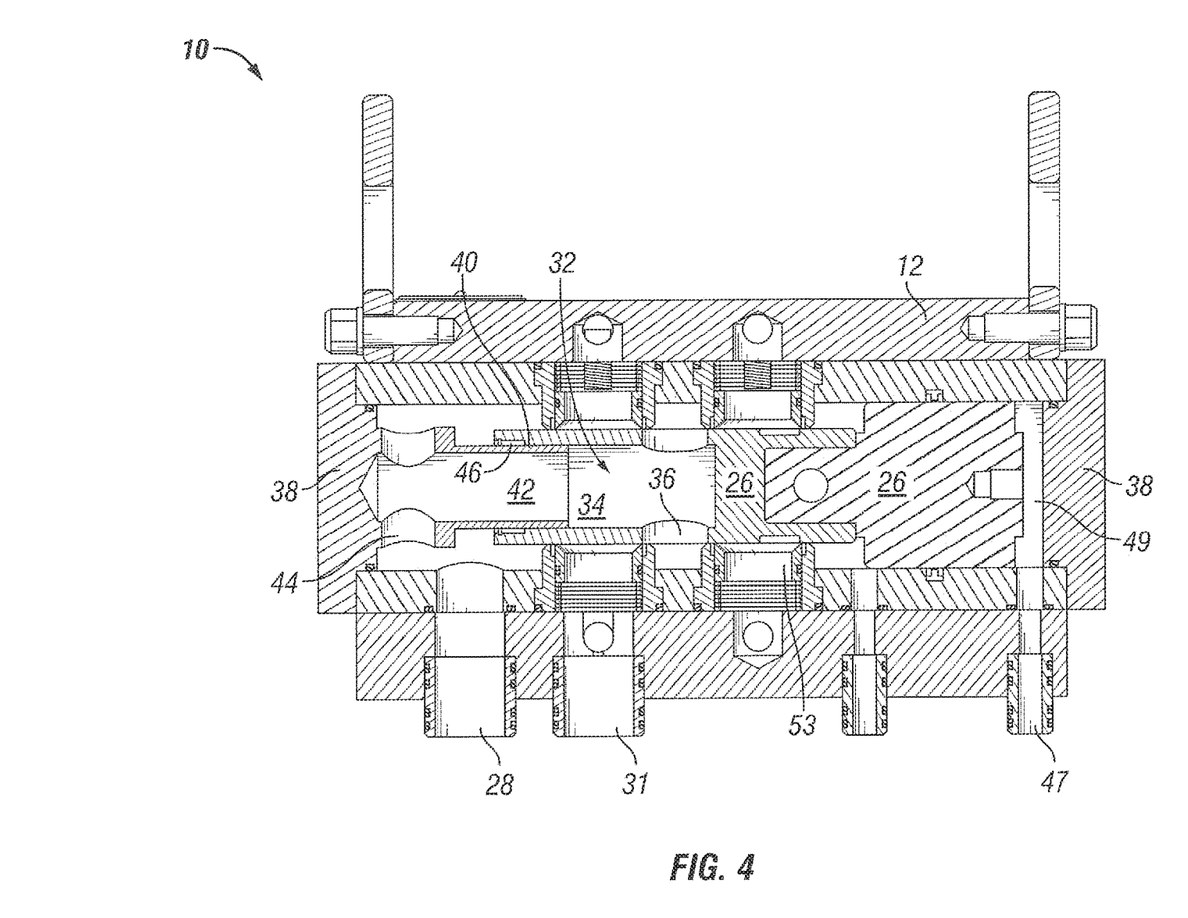
FIG. 4 shows a cross-sectional view of the pressure regulator of FIG. 1 taken along line 3-3 of FIG. 1, with the regulator piston in the closed position.

Referring now to FIG. 4, the regulator piston 26 is shown in the closed position (without a flow path between the inlet 31 and the outlet 28). In the closed position, the transverse piston bore passage 36 is not aligned with the inlet 31, such that the only fluid path into or out of the longitudinal or transverse piston bore passages 34, 36 is through the outlet 28. Movement of the regulator piston 26 between the open position of FIG. 3 and the closed position of FIG. 4 can be effected by lowering the hydraulic pressure in space 49 adjacent the end of the regulator piston 26. This lowering of hydraulic pressure can be accomplished by removing fluid from space 49 via pilot port 47.

Figure 5A:
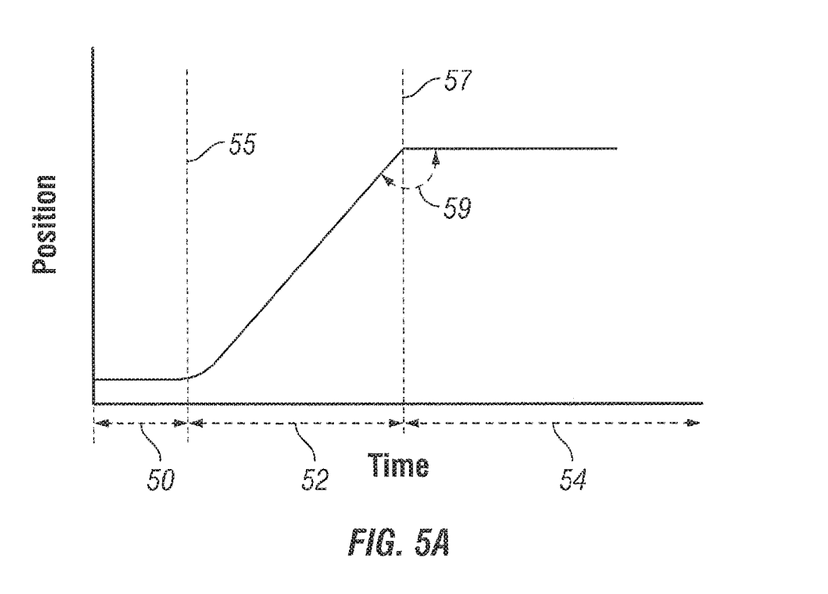
FIG. 5A is a graphical representation of the position of a known function during a stroke thereof.
Figure 5B:
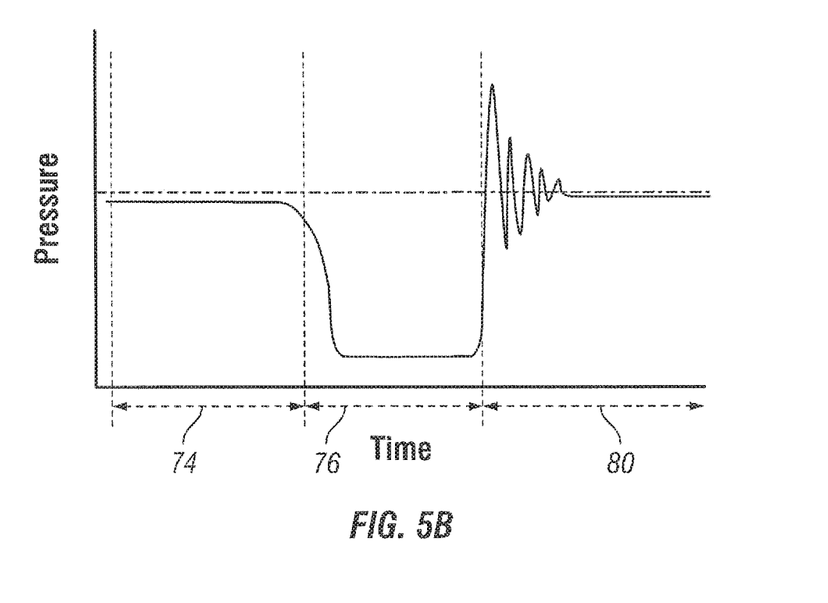
FIG. 5B is a graphical representation of the pressure during the stroke of the function of FIG. 5A, including hydraulic shock.

One problem that can occur as the regulator piston 26 moves from the open to the closed position is hydraulic shock, or water hammer, in the function. Water hammer occurs when a fluid in motion is forced to suddenly stop or change direction. FIGS. 5A and 5B are graphs that illustrate position and pressure gradients, respectively, of functions of some known systems as they close, and are meant to illustrate the problem of water hammer that the invention of the present technology addresses. Although the water hammer illustrated in FIGS. 5A and 5B occurs in the function itself, movement of an operator piston in the function corresponds to, and is controlled by, the movement of the regulator piston 26 in the regulator 10.

Referring now to FIG. 5A, there is shown the stroke of some known functions in terms of the position of the function over time. As shown, prior to initiation of the function, its position is static, as shown in portion 50 of the graph. In portion 52 of the graph, the position of the function changes as the function moves from an open position, indicated by line 55, toward a closed position, indicated by line 57. When the function reaches the closed position, it does so suddenly, and movement of an operating piston of the function stops moving almost immediately. This sudden stop at the end of the stroke is shown by the sharp angle 59 that occurs at the closed position 57.

The graph in FIG. 5B shows the pressure corresponding to the function throughout the stroke of FIG. 5A, including the phenomenon of water hammer that occurs in many known systems. Specifically, portion 74 of the graph shows the pressure of the fluid in the function when the function is fired. During this phase, the function is just beginning to move. Portion 76 of the graph shows the pressure of the fluid in the regulator while the function is actuating. As shown, during this phase, the pressure is lower than in the previous phase, but still steady. Portion 80 of the graph shows what typically happens when the function is completed. As the function completes, the function suddenly moves to the closed position and the pressure initially spikes, and then oscillates until it reaches equilibrium. This is water hammer, and it has the ability to damage components of the BOP system.

Figure 6:
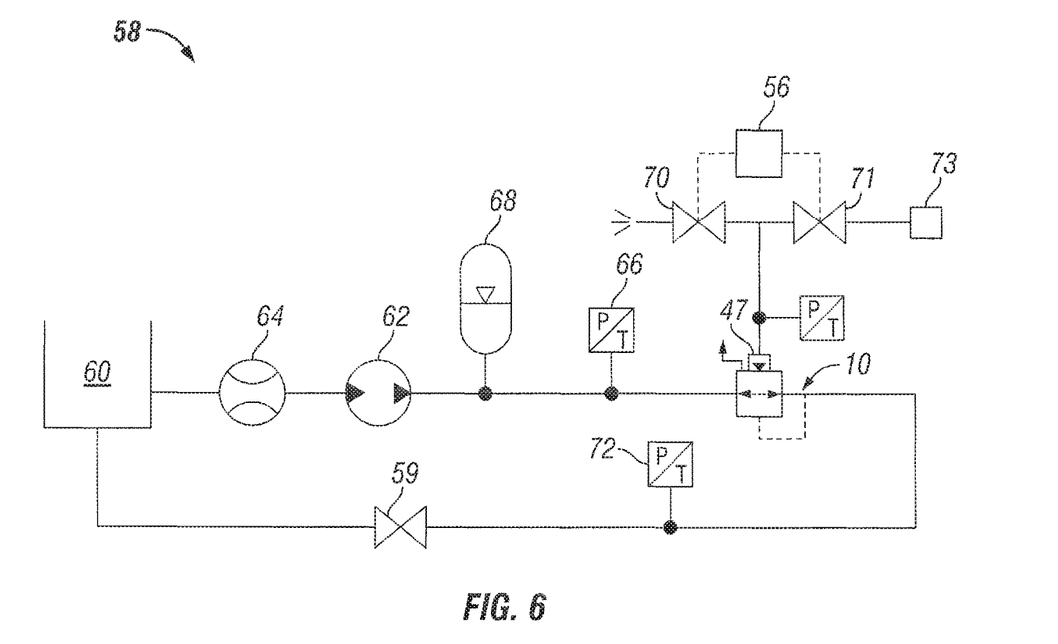
FIG. 6 is a diagram of a hydraulic circuit including a pressure regulator according to an embodiment of the present technology.

One way to reduce or eliminate water hammer in components of a BOP system is to better control the movement of the regulator piston 26 in the regulator 10 during a portion of the stroke between the open and closed positions, because such movement of the regulator piston 26 corresponds to movement of the operator piston in a function. This can be accomplished using the pilot port 47, as controlled by a controller 56 (shown in FIG. 6). The diagram of the hydraulic circuit 58 of FIG. 6 is designed to emulate a BOP control system, and is useful to show how the pilot port 47 and controller 56 can be structured and function to control a valve 59 or other BOP component, according to an example embodiment of the present technology. The controller 56 can be any device capable of receiving data and using logic to generate an output signal. For example, the controller 56 can be a programmable logic controller (PLC).

As shown in FIG. 6, hydraulic fluid used to actuate the valve 59 (or other function in the lower BOP stack 16) is stored in a fluid reservoir 60. The fluid is pumped, using a pump 62, to the regulator 10. The flow rate of the fluid between the fluid reservoir 60 and the regulator 10 can be measured using a flow meter 64, and its pressure can be measured using the pressure sensor 66. An accumulator 68 can be provided to supplement the flow if needed. Although a single accumulator 68 is shown for the sake of clarity, any number of accumulators can be used in systems of the present technology.

The regulator 10 can be structured as shown in FIGS. 3 and 4, and the position of the regulator piston 26 within the regulator 10 can be controlled using a pair of valves 70, 71 connected to the controller 56 and the pilot port 47. In practice, the controller 56 receives data related to the state of the function, as described in greater detail below, and determines whether to add fluid to the regulator 10 via the pilot port 47, thereby pushing the regulator piston 26 toward an open position, or to remove fluid from the regulator 10 via the pilot port 47, thereby moving the regulator piston 26 toward a closed position. For example, valve 71 can be opened to supply fluid to the pilot port 47 of regulator 10 from a source 73 to increase pressure in space 49 of the regulator 10. Alternately, valve 70 can be opened to vent fluid from space 49 of the regulator 10 to decrease pressure in the regulator 10.

When the regulator piston 26 is in the open position, fluid flows out of the regulator 10 through the outlet 28 and to the valve 59, or other function. The pressure of such fluid can be measured using pressure sensor 72.

To avoid water hammer in the regulator 10 after the function is fired, the controller 56 can receive information about the pressure of the fluid leaving the regulator 10, as well as about the position of the valve 59, or a function associated therewith. As the valve 59 nears its closed position, and/or an associated function nears the end of its stroke, the controller 56 can begin to reduce the hydraulic pressure in space 49, thereby beginning the process of moving the regulator piston 26 into the closed position before the function is fully completed. In this way, the controller 56 can gradually reduce the flow of fluid through the regulator as the function completes, and avoid the sudden stop of fluid flow through the regulator 10. Because the movement of the regulator piston 26 toward the closed position corresponds to movement of the valve 59, and in turn to the movement of associated functions controlled by the regulator 10 toward a closed position, such gradual movement of the functions at the end of their cycles will correspondingly lead to a gradual reduction in flow through the functions, thereby reducing water hammer in the functions. The controller 56 can be controlled by an algorithm tailored to the specific functions regulated by the regulator 10.

Figure 7:
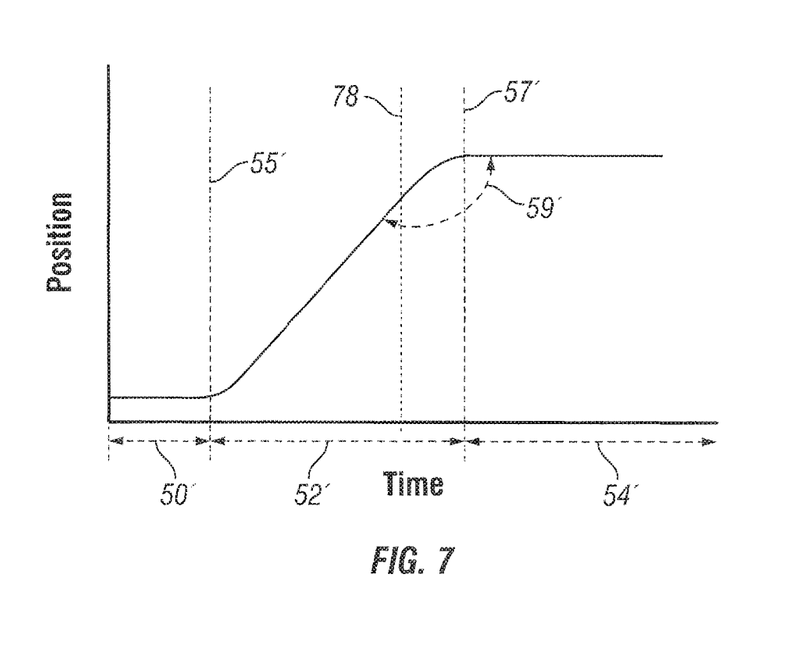
FIG. 7 is a graphical representation showing position of a function controlled using a pressure regulator of an embodiment of the present technology.

The graph in FIG. 7 shows the position of a function as the function is carried out using the regulator 10 of the present technology. The graph of FIG. 7 can be compared to that of FIG. 5A to visualize some of the distinctions between known systems (represented in FIG. 5A) versus systems of embodiments of the present technology (shown in FIG. 7). In FIG. 7, portion 50' of the graph shows the steady position of a function before the function is fired. Portion 52' of the graph shows the position of the function while the function is actuating. As shown, during this phase, the function moves at a relatively steady pace through the first part of its stroke.

Before the function is complete, however, such as at the time indicated by line 78, the controller 56 (which receives information about the state of the function as it is carried out) begins to move the regulator piston 26 in the regulator 10, toward the closed position using the pilot port 47. This allows a gradual diminishing of the flow rate through the regulator 10, and a corresponding slowing of the function, as the function nears completion. Finally, portion 54' of the graph shows the steady state of the closed position when the function is completed. Notably, between time 78, when the function begins to slow, and time 57', when the function is complete, the position of the function gradually slows. The result is that the end of the stroke is defined by a gradual curve 59', in contrast to the sudden stop indicated by the angle 59 of FIG. 5A. By avoiding the sudden stop at the end of the stroke, water hammer can be reduced or eliminated.

One surprising feature of the present technology is that adjustment of the hydraulic pressure in space 49 via the pilot port 47 alone will move the regulator piston 26 and reduce flow rate through the regulator 10. The benefit to this feature is that controlling the movement of the regulator piston 26 during operation of the regulator 10 is simplified, because an operator need only control the pressure into the pilot port 47 to control the regulator piston 26. Although the pilot pressure alone can move the regulator piston 26 toward a closed position, in some embodiments, a spring or other device can also be employed to help move the regulator piston 26.

Figure 8A:
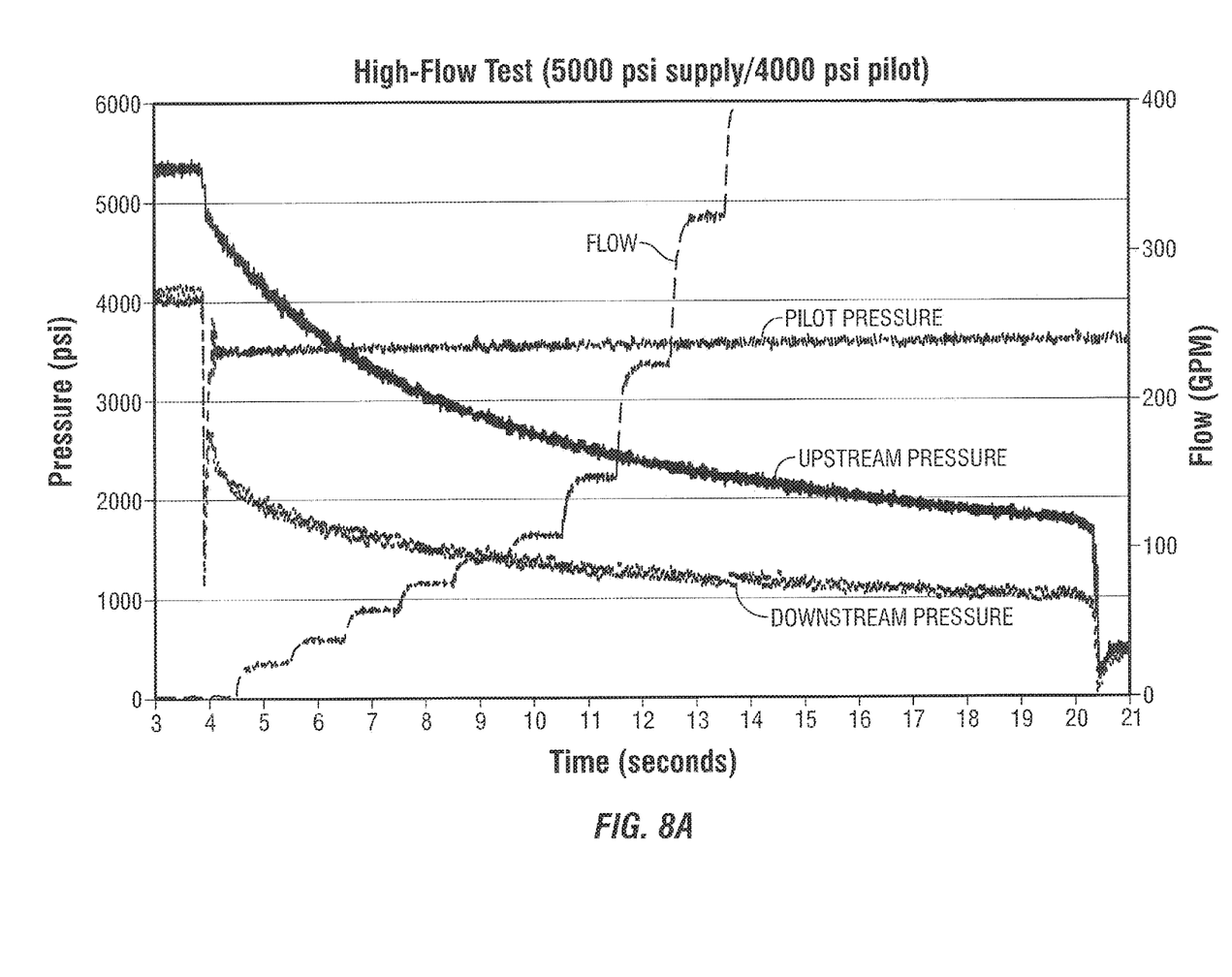
FIG. 8A is a chart showing the relationship of fluid flow to pilot pressure in a pressure regulator of the present technology when the pilot pressure is set at a predetermined level.
Figure 8B:
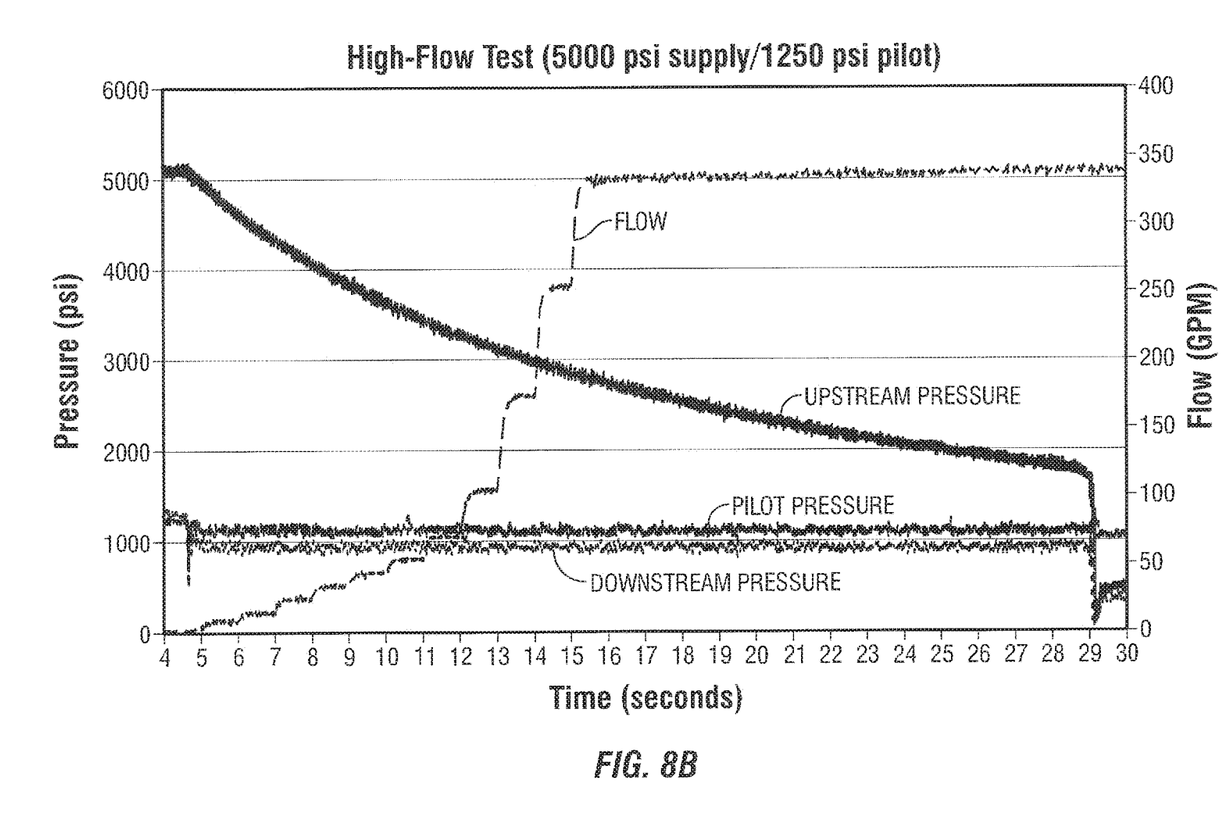
FIG. 8B is a chart showing the relationship of fluid flow to pilot pressure in a pressure regulator of the present technology when the pilot pressure is set at an alternate predetermined level to that shown in FIG. 8A.
Figure 8C:
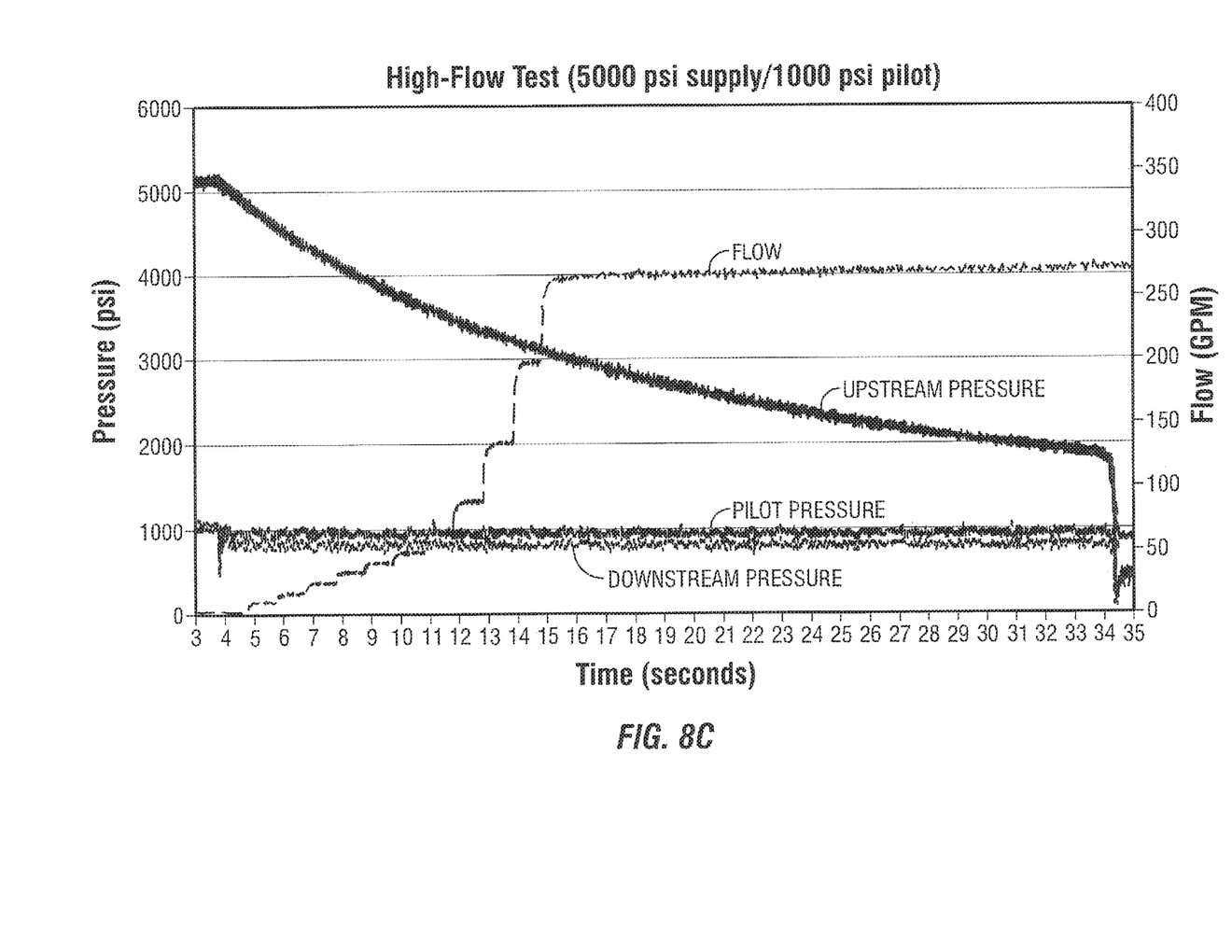
FIG. 8C is a chart showing the relationship of fluid flow to pilot pressure in a pressure regulator of the present technology when the pilot pressure is set at an alternate predetermined level to that shown in FIGS. 8A and 8B.
Figure 8D:
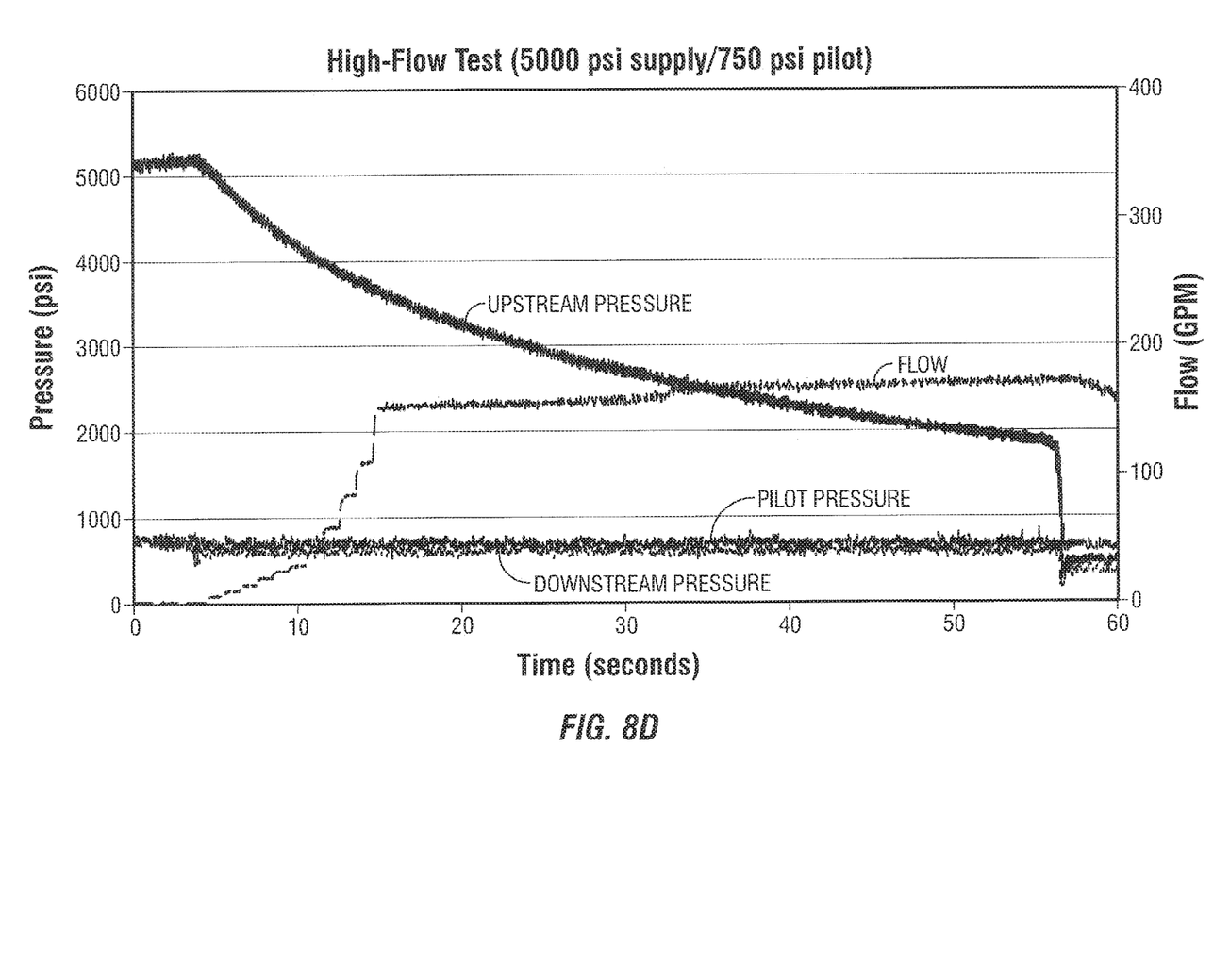
FIG. 8D is a chart showing the relationship of fluid flow to pilot pressure in a pressure regulator of the present technology when the pilot pressure is set at an alternate predetermined level to that shown in FIGS. 8A-8C.

FIGS. 8A-8D are charts depicting experimental results related to the correlation between the pilot pressure and flow rate in the regulator 10. Of course, the flow rate through the regulator 10 is directly related to the position of the regulator piston 26, which is controlled by the pilot pressure. FIG. 8A shows that when the pilot pressure is set relatively high (4,000 psi), the flow rate remains high as well (about 400 GPM). As illustrated in the charts of FIGS. 8B, 8C, and 8D, however, as the pilot pressure drops, so does the flow rate. For example, a pilot pressure of 1,250 psi in FIG. 8B corresponds to a flow rate of less than 350 GPM. Similarly, a pilot pressure of 1,000 psi in FIG. 8C corresponds to a flow rate of about 275 GPM, and a pilot pressure of 750 psi corresponds to a flow rate of only about 175 GPM.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A method of reducing hydraulic shock in a BOP system, the BOP system including a pressure regulator having an input port and an output port, and a regulator piston that moves between an open position and a closed position based on a change in hydraulic pressure applied to the regulator piston via a pilot port, the open position creating a fluid path between the input port, an internal passage in the regulator piston, and the output port so that fluid can flow therebetween, and the closed position severing the fluid path, the method comprising:
 (a) initiating a function in the BOP system;
 (b) flowing a function fluid between the function and the fluid path of the pressure regulator when the pressure regulator is in the open position;
 (c) monitoring a position of the function as the function moves to predict when the function nears a cycle end;
 (d) transmitting information about the position of the function to a controller that controls the amount of hydraulic pressure applied to the regulator piston via the pilot port;
 (e) determining when the function reaches a predetermined position prior to the cycle end; and
 (f) when the function reaches the predetermined position, adjusting the hydraulic pressure on the regulator piston via the pilot port to begin moving the regulator piston toward the closed position, the adjusting comprising moving a regulator fluid in or out of a space adjacent an end of the regulator piston opposite the internal passage of the regulator piston.

2. The method of claim 1, wherein the regulator piston moves toward the closed position by flowing the regulator fluid out of the pilot port to reduce the amount of hydraulic pressure applied to the end of the regulator piston.

3. The method of claim 1, wherein step (f) further comprises controlling the amount of hydraulic pressure applied through the pilot port using a valve.

4. The method of claim 1, wherein the function is selected from the group consisting of a valve and a blowout preventer ram.

5. The method of claim 1, further comprising the step of determining the pressure in a regulator housing adjacent the inlet port via a pressure read-back port.

6. The method of claim 1, wherein the controller processes the information about the position of the function, and employs an algorithm to determine when to begin adjusting the hydraulic pressure on the regulator piston.

7. The method of claim 1, wherein the pressure in the outlet port is substantially equal to the pressure in the pilot port.

* * * * *